(12) United States Patent
Barrilleaux et al.

(10) Patent No.: US 8,860,324 B2
(45) Date of Patent: Oct. 14, 2014

(54) SELECTIVE LIGHT SENSOR AND AUTO-COMMISSIONING

(75) Inventors: Jonathan M. Barrilleaux, Oakland, CA (US); Mark Covaro, Sonoma, CA (US)

(73) Assignee: Redwood Systems, Inc., Fremont, CA (US)

( * ) Notice: Subject to any disclaimer, the term of this patent is extended or adjusted under 35 U.S.C. 154(b) by 487 days.

(21) Appl. No.: 13/328,286

(22) Filed: Dec. 16, 2011

(65) Prior Publication Data

US 2013/0155392 A1    Jun. 20, 2013

(51) Int. Cl.
*H05B 37/02* (2006.01)
(52) U.S. Cl.
USPC ............ 315/291; 315/151; 315/297; 315/307; 315/312
(58) Field of Classification Search
USPC ............. 315/185 R, 192, 291, 294, 297, 307, 315/308, 312
See application file for complete search history.

(56) References Cited

U.S. PATENT DOCUMENTS

| | | | |
|---|---|---|---|
| 5,446,342 A | 8/1995 | Nilssen | 315/129 |
| 6,583,573 B2 * | 6/2003 | Bierman | 315/149 |
| 6,888,633 B2 | 5/2005 | Vander Jagt et al. | 356/407 |
| 7,014,336 B1 | 3/2006 | Ducharme et al. | 362/231 |
| 7,387,405 B2 | 6/2008 | Ducharme et al. | 362/231 |
| 7,520,634 B2 | 4/2009 | Ducharme et al. | 362/276 |
| 7,689,130 B2 | 3/2010 | Ashdown | 398/172 |
| 7,919,937 B2 | 4/2011 | Tracy et al. | 315/307 |
| 8,008,613 B2 | 8/2011 | Tam | 250/226 |
| 2004/0105264 A1 | 6/2004 | Spero | 362/276 |
| 2005/0110416 A1 | 5/2005 | Veskovic | 315/149 |
| 2009/0267540 A1 | 10/2009 | Chemel et al. | |
| 2009/0284747 A1 | 11/2009 | Valois | 356/448 |
| 2010/0026194 A1 * | 2/2010 | Paton | 315/152 |
| 2010/0084992 A1 | 4/2010 | Valois et al. | 315/291 |
| 2010/0214082 A1 | 8/2010 | Covaro et al. | 340/310.12 |
| 2010/0315010 A1 | 12/2010 | Damink et al. | 315/152 |
| 2011/0031897 A1 | 2/2011 | Henig et al. | 315/297 |
| 2011/0076024 A1 | 3/2011 | Damink | 398/130 |
| 2011/0089842 A1 | 4/2011 | Aldrich et al. | 315/152 |
| 2011/0156596 A1 | 6/2011 | Salsbury | 315/152 |
| 2011/0180687 A1 | 7/2011 | Rains, Jr. et al. | 250/205 |
| 2011/0199004 A1 | 8/2011 | Henig et al. | 315/152 |
| 2011/0199020 A1 | 8/2011 | Henig et al. | 315/294 |
| 2011/0202151 A1 | 8/2011 | Covaro et al. | 700/90 |

OTHER PUBLICATIONS

U.S. Appl. No. 13/328,313, filed Dec. 16, 2011, Barilleaux.

* cited by examiner

*Primary Examiner* — Douglas W Owens
*Assistant Examiner* — Thai Pham
(74) *Attorney, Agent, or Firm* — Myers Bigel Sibley & Sajovec, P.A.

(57) ABSTRACT

A system and method for commissioning a lighting system is provided in which signals from light sensors are filtered in order to determine whether light is received from light fixtures in the lighting system or from external light sources. Alternatively or in addition, signals from light sensors may be filtered to determine the amount of light from external light sources. By filtering the signals from the light sensors, an identification of which light fixtures are colocated with which light sensors may be made even in the presence of light received from external light sources or light from multiple light fixtures in the lighting system. Physical locations of light fixtures and/or sensors may be determined based on detecting the amount of light received from external light sources.

19 Claims, 3 Drawing Sheets

SELECTIVE LIGHT SENSOR AND AUTO-COMMISSIONING

BACKGROUND

1. Technical Field

This application relates to lighting systems and, in particular, to commissioning lighting systems.

2. Related Art

Lighting systems may include light fixtures and sensors. When a lighting system is first installed in a building, the light fixtures and the sensors may be electrically coupled to a device that powers the light fixtures and receives information from the sensors. However, the device that is coupled to the light fixtures and sensors may not yet have any information about which lighting area in the building each one of the light fixtures illuminates or where any of the sensors or light fixtures are located.

SUMMARY

A system may be provided for commissioning light fixtures that includes a power device, a sensor, a filter, and a commissioning module. The power device may provide a predetermined power signal to a light source associated with a light fixture, such as a lamp of the light fixture or a light emitter installed next to the light fixture for the purpose of commissioning the light fixtures. The sensor may generate a sensor signal that indicates an amount of light received by the sensor. The filter may generate a filtered signal from the sensor signal such that the filter blocks any component of the sensor signal representing light received from a source other than the light source associated with the light fixture, such as the sun, and passes any component of the sensor signal representing light from the light source associated with the light fixture. The filtered signal may indicate that the sensor received light from the light source associated with the light fixture despite the presence of light from the source other than the light fixtures. The commissioning module may determine that the light fixture is colocated with the sensor based on an indication by the filtered signal that the sensor received light from the light fixture.

A computer readable medium may also be provided for commissioning light fixtures that includes instructions executable with a processor. When the instructions are executed with the processor, the processor may selectively cause each respective one of multiple light sources associated with the light fixtures to be powered by a predetermined power signal. Each one of the light sources may correspond to a respective one of the light fixtures. The processor may receive an indication that a filtered signal of a sensor indicates the sensor received light from a selected one of the light sources associated with a selected one of the light fixtures. The filtered signal may include a component of a sensor signal that represents light from a selected one of the light fixtures. However, a component of the sensor signal that represents light from a source other than the selected one of the light fixtures may be excluded from the filtered signal. The processor may determine that the selected one of the light fixtures is colocated with the sensor based on the indication that the filtered signal of the sensors indicates the sensor received light from the selected one of the light fixtures.

A method may be provided to commission a lighting system. Each respective one of multiple light fixtures may be caused to be powered by a predetermined power signal. An indication may be received that a filtered signal of a sensor indicates the sensor received light from a light source associated with a light fixture. The sensor may receive light from light source associated with the light fixture and, at the same time, from a source other than the light fixture. The light fixture may be determined to be colocated with the sensor based on receipt of the indication that the filtered signal of the sensor indicates the sensor received light from the light source associated with the light fixture.

A lighting system may be provided for auto-commissioning light fixtures that includes a light fixture, a sensor, a filter, and a commissioning module. The light fixture may illuminate a lighting area. The sensor may detect light in the lighting area and generate a sensor signal representing the light detected by the sensor. A filter may generate a filtered signal from the sensor signal, where the filter passes a component of the sensor signal that represents light generated by a light source other than the light fixture and blocks a component of the sensor signal that represents light generated by the light fixture. The commissioning module may receive an indication that the filtered signal indicates the amount of light generated by the light source other than the light fixture. The commissioning module may determine a physical location of the light fixture based at least in part on the amount of light detected by the sensor that is generated by the light source other than the light fixture.

Further objects and advantages of the present invention will be apparent from the following description, reference being made to the accompanying drawings wherein preferred embodiments of the present invention are shown.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

In one example, a system for commissioning light fixtures may include a power device, a sensor, a filter, and a commissioning module. The commissioning module may be included in the power device. Alternatively, the commissioning module may be included in a device, such as a laptop, that is external to the power device.

The power device may individually provide a predetermined power signal to each respective one of the light fixtures. The power signal can be provided sequentially, in parallel, or in any suitable order to the light fixtures. For example, the power device may provide a first one of the light fixtures with the predetermined power signal, and then provide a second one of the light fixtures with the predetermined power signal, and so on. When any of the light fixtures are not provided the predetermined power signal, the light fixtures may turn off. Alternatively, the commissioning module may cause the power device to selectively provide a first determined power signal to each respective one of the light fixtures, and cause the power device to provide a second determined power signal to the light fixtures other than the respective one of the light fixtures while the respective one of the light fixtures is provided the first determined power signal. The first and second determined power signals may be pulse width modulation signals having a first modulation frequency or coding and a second modulation frequency or coding, respectively. To the occupants, the light fixtures provided with the first and second determined power signals may appear to be turned on and operating normally. Alternatively or in addition, predetermined but unique power signals may be provided to each fixture in the system or a portion of the system at substantially the same time, so that the commissioning may performed more quickly, in parallel. Each of the unique power signals may be unique as compared with the other power signals provided to the light fixtures. Two or more power signals may be considered provided at substantially the same time if at least a portion of each of the power signals is provided to the light fixtures at the same time. Yet another example may combine the sequential and the parallel approaches.

The predetermined or determined power signal may be a pulse width modulation signal. Alternatively or in addition, the predetermined or determined power signal may have any suitable form or forms, such as a sine wave, a square wave, and a pulse wave.

The sensor may generate a sensor signal that indicates an amount of light received by the sensor. The filter may generate a filtered signal from the sensor signal. The light detected by the sensor may include light from the light fixture and light from a source other than the light fixtures, such as the sun. The filter that generates the filtered signal of the sensor may block a frequency or temporal component of a sensor signal that represents the light received from the source other than the light fixtures. Accordingly, the filtered signal may indicate that the sensor received light from the light fixture despite the presence of light from the source other than the light fixtures. The commissioning module may determine that the light fixture is colocated with the sensor based on an indication by the filtered signal that the sensor received light from the light fixture.

Figure 1:
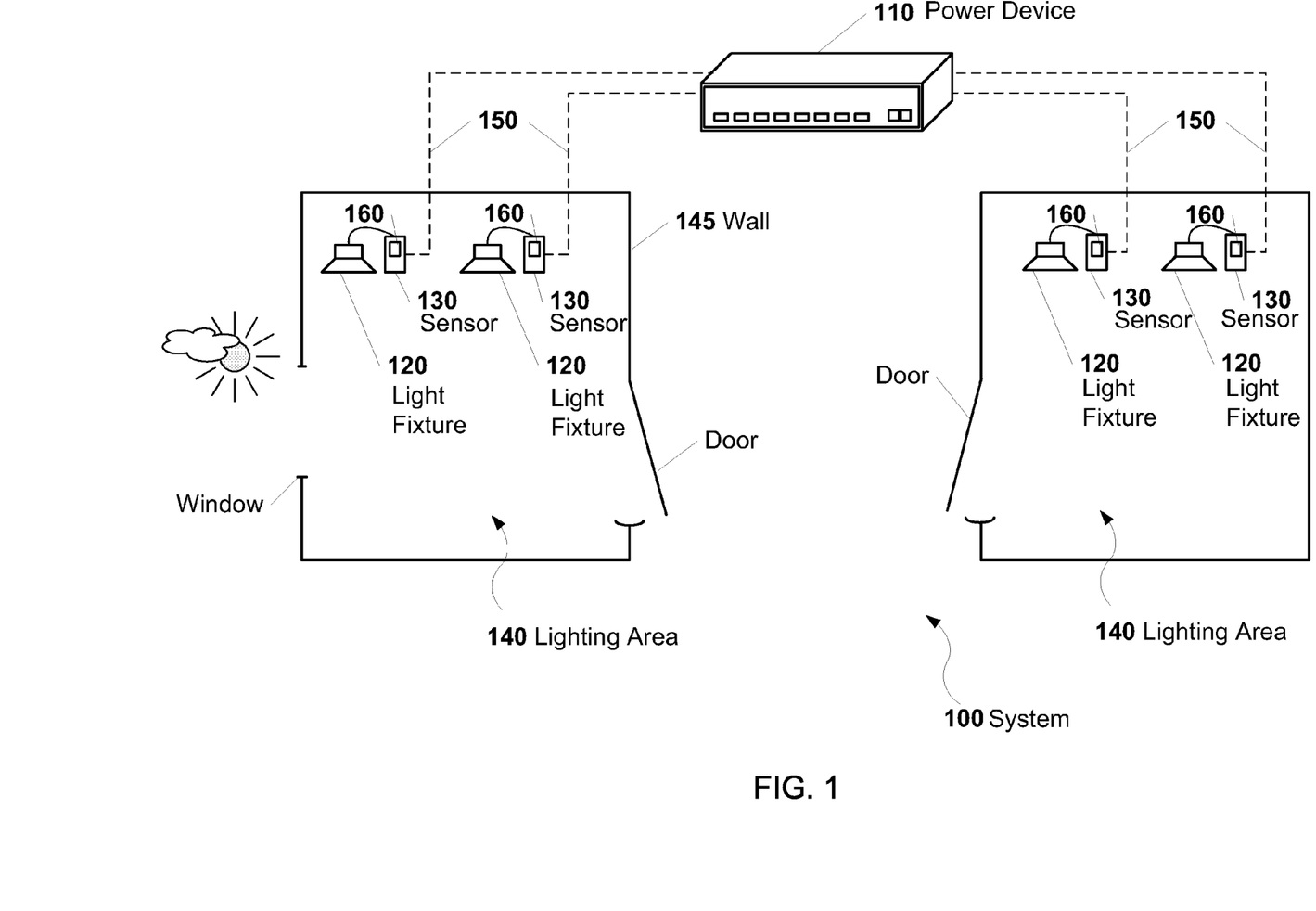
FIG. 1 illustrates an example of a lighting system.

FIG. 1 illustrates an example of a system 100 for commissioning a lighting system. The system 100 for commissioning the lighting system may include a power device 110, light fixtures 120, and sensors 130. The system 100 may include any number of light fixtures 120, sensors 130, and power devices 110.

Each light fixture 120 or luminaire may be any electrical device or combination of devices that creates artificial light from electricity. The light fixture 120 may distribute, filter or transform the light from one or more lamps included or installed in the light fixture 120. Alternatively or in addition, the light fixture 120 may include one or more lamps. The lamps may include incandescent bulbs, LED lights, fluorescent tubes, any other device now known or later discovered that generates artificial light, or any combination thereof. The light fixture 120 may be located anywhere in or near a lighting area 140. Light generated by one or more light fixtures 120 may illuminate the lighting area 140. The light fixture 120 may be coupled to a ceiling, a floor, a wall 145, or some other surface of a building or physical structure from which the light fixture 120 may project light into the lighting area 140. The light fixtures 120 may illuminate any number of lighting areas 140. When coupled to a surface, the light fixture 120 may be embedded below the surface, installed partially below the surface, positioned on the surface, located in a housing, or positioned in any other suitable configuration with respect to the surface so that the light fixture 120 may transmit light into one or more of the lighting areas 140. The light fixture 120 may be affixed to the surface or be adjacent to the surface. Examples of the light fixture 120 include a compact fluorescent light, a task/wall bracket fixture, a linear fluorescent high-bay, a spot light, a recessed louver light, a desk lamp, a troffer, or any other device that includes one or more lamps.

The lighting area 140 may include any physical space that may be illuminated by one or more of the light fixtures 120. The lighting area 140 may include an area outside of a building, an area inside of a building, a room, a portion of the room, a workspace, any other area that may be lit by at least one of the light fixtures 120, or any combination thereof. The lighting area 140 may be a two-dimensional space or a three-dimensional space.

The power device 110 may be any device or combination of devices that supplies power to the light fixtures 120. For example, the power device 110 may include AC/DC (Alternating Current/Direct Current) converters that power the light fixtures 120. Alternatively or in addition, the power device 110 may include DC/DC converters that power the light fixtures 120. The power device 110 may be electrically coupled to each of the light fixtures 120 with twisted-pair wiring, 12 AWG (American Wire Gauge) building wiring, 18 AWG wiring, or any other type of wiring 150.

The power device 110 may provide power to, and communicate with, the sensors 130. Each sensor 130 may be electrically coupled to the wiring 150 that powers a corresponding one of the light fixtures 120. Accordingly, the power device 110 may provide power over the wiring 150 to the sensor 130 and to the corresponding light fixture 120. The sensor 130 may transmit information, such as sensor data, over the wiring 150 to the power device 110. Communication between the sensor 130 and the power device 110 may be unidirectional or bidirectional.

The sensor 130 may be any electrical component or combination of electrical components that detects light. The detected light may include light in the visible spectrum. The sensor 130 may generate a sensor signal that indicates an amount of light detected by the sensor 130. Examples of the sensor 130 include, but are not limited to, a photosensor, an optical detector, a chemical detector, a photoresistor or LDR (light dependent resistor), a photovoltaic cell or solar cell, a photodiode, a photomultiplier tube, a phototransistor, a LED (light emitting diode) reverse-biased to act as a photodiode, an infrared detector, or any other light-sensing device. The sensor 130 may be located anywhere in or near the lighting area 140. In one example, the sensor 130 may be included in the light fixture 120. In a second example, the sensor 130 may be positioned adjacent to or near a corresponding one of the light fixtures 120. In a third example, the sensor 130 may be coupled to a ceiling, a floor, the wall 145, or some other surface of a building or physical structure where light in the lighting area 140 may be detected. When coupled to a surface, the sensor 130 may be embedded below the surface, installed partially below the surface, positioned on the surface, located in a housing, or be positioned in any other suitable configuration with respect to the surface so that the sensor 130 may receive light present in the lighting area 140.

The sensor 130 may include a filter 160. The filter 160 may be any device that blocks a first component of the sensor signal generated by the sensor 130 and passes a second component. For example, the filter 160 may isolate a particular frequency or range of frequencies, or a particular code or range of codes, at which the amplitude of light waves vary. In particular, the filter 160 may generate a filtered signal that includes the isolated frequency or code, range of frequencies or codes, or multiple frequencies or codes. The filter 160 may be implemented as a band-pass filter, a low-pass filter, a high-pass filter, a comb filter, a matched filter, a convolution filter, a correlation filter, a digital signal processor, or any other type of filter or combination of filters. In one example, the filter 160 may include a microcontroller, a microprocessor or some other type of processor or combination of processors (not shown). Accordingly, the processor may operate on the sensor signal, which may represent the light detected by the sensor 130, by processing the sensor signal to generate the filtered signal as a filtered sensor signal. For example, the processor may perform FFTs (fast Fourier transforms) on the sensor signal. The sensor 130 may transmit the filtered signal, or information about the filtered signal, to the power device 110.

The nature of the light waveform generated by the light fixture 120 and corresponding characteristics of a waveform of the sensor signal and/or filtered signal may be distinguished in frequency and/or in time from waveforms generated by, or detected from, other light sources. For example, the light from the light fixture 120 may be modulated such that the sensor signal and/or filtered signal may include information inserted using a Frequency, Code, or Time Division Multiplexing (FDM, CDM, or TDM) scheme, Frequency-Shift Keying (FSK) pulse code modulation (PCM), orthogonal pulse coding, or any other data communication scheme. The waveform isolated in the filtered signal may include information identifying and distinguishing light sources, and/or indicate intensities of light sources. The component of the sensor signal blocked or passed by the filter 160 may be an amplitude of one or more frequencies of the sensor signal in the frequency spectrum or a waveform or pattern, such as a waveform generated by pseudorandom number sequences used in spread-spectrum communication.

When the lighting system is installed, the light fixtures 120 and the sensors 130 may be electrically coupled to the power device 110. When the light fixtures 120 and the sensors 130 are first electrically coupled to the power device 110, the power device 110 may be able to power the light fixtures 120, and receive information from the sensors 130. However, the power device 110 may not yet have any information about which one of the lighting areas 140 each of the light fixtures 120 illuminates. Grouping the light fixtures 120 by the lighting area 140 that the light fixtures 120 illuminate, may be desirable. For example, the light fixtures 120 that illuminate a corresponding one of the lighting areas 140 may be grouped together. Thereafter, each group of the light fixtures 120 may be controlled as group. For example, all of the light fixtures 120 in one group may be turned off if no person is detected in the lighting area 140 that corresponds to the group.

Similarly, the power device 110 may not have any information about which of the sensors 130 detect light in each one of the lighting areas 140. Such aggregate knowledge may be used by the power device 110 to control the light fixtures 120 that illuminate each of the lighting areas 140 based on sensor information received from any or all of the sensors 130 in one or more of the lighting areas 140. For example, the power device 110 may use such knowledge in order to turn off the light fixtures 120 in one group if no person is detected in the corresponding lighting area 140 by the sensor 130 or the sensors 130 that detect light in the corresponding lighting area 140.

In other words, the power device 110 may not have knowledge of which of the light fixtures 120 and/or the sensors 130 are colocated. A group of the light fixtures 120 may be colocated if each of the light fixtures 120 in the group illuminate the same lighting area 140 as the other light fixtures 120 in the group. Similarly, a group of the sensors 130 may be colocated if each of the sensors 130 in the group detects light in the same lighting area 140 as the other sensors 130 in the group. Any of the light fixtures 120 may be colocated with any of the sensors 130 if the sensor 130 detects light in the same lighting area 140 that the light fixture 120 illuminates. Alternatively or in addition, any of the light fixtures 120 may be colocated with any of the sensors 130 if the sensor 130 detects a light pattern or signature that is generated by the light fixture 120. Alternatively or in addition, a determination may be made that the sensor 130 detects light from a selected light source if a pattern or signature generated by the selected light source is detected by the sensor 130 and/or filter 160. For example, sunlight may cause the sensor 130 to generate DC (Direct Current) of some amplitude. If the filter 160 detects DC current in the sensor signal, then a determination may be made that the sensor 130 received sunlight.

The process of forming groups of the light fixtures 120 that are colocated and/or groups of the sensors 130 that are colocated is known as spatially commissioning the lighting system. Commissioning may be automated using auto-commissioning. One mechanism to perform auto-commissioning includes sequentially causing each of the light fixtures 120 to illuminate individually and determining which of the sensors 130 detect light when the light fixture 120 is illuminated. The sensors 130 that detect light when the light fixture 120 is illuminated may be considered colocated with the light fixture 120. More generally, auto-commissioning may involve modulating one or more light sources, such as one or more of the light fixtures 120, so that illumination of the lighting areas 140 by the light fixtures 120 is undisturbed by a signifying and an identification of the light sources. To occupants of the lighting areas 140, the illumination may be maintained while the system 100 may signify and identify the light sources modulated by the system 100. Also, a mechanism to perform auto-commissioning may involve sequentially, or in parallel, causing a light source colocated with each corresponding one of the light fixtures 120 to illuminate or signify. In one example, the light source colocated with each corresponding one of the light fixtures 120 may be a light source, such as an LED, that is dedicated to performing auto-commissioning. In a second example, the light source colocated with each corresponding one of the light fixtures 120 may be the one or more lamps included in each corresponding one of the light fixtures 120. Any of the sensors 130 may be determined to be colocated with the light fixture 120 if the sensor 130 detects a level of light that exceeds a threshold light level when the light source is illuminated. The light fixtures 120 that are determined to be colocated with one of the sensors 130 may be determined to be colocated with each other. Further examples of auto-commissioning are described in U.S. Patent Application Publication 2011/0031897 A1, published Feb. 10, 2011.

When daylight or artificial light not controlled by the power device 110 is present in the lighting area 140, then auto-commissioning may not operate properly. Accordingly, auto-commissioning may be performed at night or when the amount of daylight or sunlight in the lighting areas 140 is limited. However, it may be desirable to perform the auto-commissioning at any time of the day or in the presence of other artificial light sources, such as desk lamps, temporary lighting for construction, and any other light source not controlled by the system 100. Furthermore, sequentially causing each of the light fixtures 120 to illuminate while the other light fixtures 120 are not illuminated may be annoying to users of the lighting system 110. The power device 110 in conjunction with the filter 160 may address these issues.

The filtered signal produced by the filter 160 may include a frequency or temporal component that represents light generated by one or more of the light fixtures 120 but exclude a frequency or temporal component that represents daylight or artificial light controlled by devices other than the power device 110. Daylight, and artificial light not controlled by the power device 110, may be referred to as non-system light or external light. The light fixtures 120 may produce light having an amplitude that varies at a particular frequency. For example, the power device 110 may power the light fixtures 120 using a pulse width modulated (PWM) signal that has a carrier frequency. The carrier frequency may be the pulse width modulation frequency. Alternatively or in addition, the pulse modulation may include a signature identifying the source of the light. The carrier frequency may be high enough that humans do not perceive any flickering of the light produced by the light fixtures 120. The carrier frequency or other component may also be distinct from the component representing light produced by non-system light sources. Examples of non-system light sources may include: daylight, with no frequency component; a fluorescent light that generates light having a line frequency (50/60 hertz) component, or a higher frequency digital ballast (e.g. 100 kilohertz) component; an incandescent lamp that generates light having a 60 hertz component; a light source that operates at a different PWM carrier frequency than the light fixtures 120, or any other suitable light source. The filter 160 may be tuned to the carrier frequency of the system 100 and/or to the carrier frequency of one or more of the light fixtures 120. Accordingly, the filtered signal from the filter 160 may indicate the amount of light received from one or more of the light fixtures 120, but not the light received from other sources, such as daylight or non-system artificial light.

As noted above, the unfiltered sensor signal from the sensor 130 may represent the detected amount of light from both natural and artificial sources. In other words, the unfiltered sensor signal may indicate the amount of light received from both system and non-system light sources. Therefore, the difference between the unfiltered sensor signal and the filtered signal may represent the amount of detected light that is not produced by the light fixtures 120 of the system 100. Accordingly, the sensor 130 and/or the power device 110 may determine the amount of sensed light that is produced by the light fixtures 120 of the system 100, the amount of sensed light produced by light sources other than the light fixtures 120, and the total amount of light sensed by each sensor 130.

With the filters 160, the power device 110 may perform auto-commissioning when non-system light is present in the lighting area 140. As described earlier, auto-commissioning may involve sequentially or in parallel causing a light source colocated with each corresponding one of the light fixtures 120 to illuminate or signify. The light source may be powered by the power device 110 using a power signal that has a carrier frequency or pulse coding. The filter 160 in each of the sensors 130 may be tuned to match the frequency or pulse coding of the carrier signal of the power signal. The filter 160 may be pre-tuned to one or more frequencies or components. Alternatively, the filter 160 may be dynamically tuned to a target frequency or frequencies or components, during operation of the power device 110. The filtered signal may represent the amount of light generated by the light source—and not other light sources that may illuminate the lighting area 140. Any of the sensors 130 may be considered colocated with the light fixture 120 if the filtered signal from the sensor 130 indicates that the light generated by the light source exceeds a threshold light level when the light source is illuminated. The threshold light level may be zero or any other value.

The carrier frequency or pulse coding of light from the light source may shift between two or more frequencies or codes. For example, the light source may be powered by a pulse-width modulated signal that has a constant duty cycle, but the frequency of the modulation of the pulse-width modulated signal may shift between two modulation frequencies. The frequency of the modulation may shift in order to transmit data from the power device to the light fixture or adapter. Alternatively or in addition, the frequency of the modulation may shift in order to further distinguish light produced by the light source from light received from other sources. In other words, a signature waveform of the light source may exhibit the shift between the two modulation frequencies. Accordingly, the filter 160 may include two filters: each one of the filters may isolate a corresponding frequency component of the unfiltered sensor signal at a respective one of the two modulation frequencies. The power device 110 or other component of the system 100 may distinguish light produced by the light source from light received from other light sources by determining that the amplitude of the filtered signal produced by each of the filters 160 exceeds a threshold level. Alternatively, the filter 160 or the sensor 130 may perform signal processing on the output of a single band-pass filter or on the unfiltered sensor signal in order to detect the signature waveform of the light source.

As noted above, sequentially causing each of the light fixtures 120 to illuminate while the other light fixtures 120 are not illuminated may be annoying to users of the lighting system 110. As an alternative, the system 100 may cause each one of the light fixtures 120 to produce light that has a characteristic distinguishable from light that may be produced by any of the other light fixtures 120. The sensors 130 that detect light having the distinguishable characteristic when the light fixture 120 produces light with the distinguishable characteristic may be determined to be colocated with the light fixture 120. The light fixtures 120 that are determined to be colocated with one of the sensors 130 may be determined to be colocated with each other.

The light having the distinguishable characteristic may have a determined wave shape, frequency, amplitude, timing, or other characteristic. For example, the light may be modulated at an alternate carrier frequency or pulse coding. In other words, the power device 110 may power the light fixture 120 that is to produce light having the distinguishable characteristic at the alternate carrier frequency, and power any other light fixture 120 at a common carrier frequency. The alternate carrier frequency may differ from the common carrier frequency by a predetermined frequency difference. The filter 160 for each of the sensors 130 may be tuned to the alternate carrier frequency during auto-commissioning. In one example, the filter 160 may be tuned to the alternate carrier during normal operation as well as during auto-commissioning. Accordingly, the filtered signal generated by the filter 160 during auto-commissioning may indicate the amount of light received by the sensor 130 from the light fixture 120 that is powered by the power signal having the alternate carrier frequency. The light fixtures 120 may be selectively operated at the alternate carrier frequency. The filtered signal generated by the filter 160 may indicate when the sensor 130 receives light from the light fixture 120 that is operated at the alternate carrier frequency. Any of the non-selected light fixtures 120 may be on, and operated at the common carrier frequency, without interfering with the ability of the filter 160 to indicate that the sensor 130 received light from the light fixture 120 that is operated at the alternate carrier frequency. Thus, auto-commissioning may be performed during the day without having to turn off any of the light fixtures 120 that are on prior to auto-commissioning, or that are switched on during auto-commissioning.

Because the power device 110 may control each of the light fixtures 120 and receive information from each of the sensors 130, the distinguishable characteristic of the light produced by the selected light fixture 120 during auto-commissioning may have a timing component. For example, the power device 110 may modulate the power signal that powers the selected light fixture 120 using a random or predetermined pattern stored in the power device. If the power device 110 receives, within a predetermined amount of time, the filtered signal from one of the sensors 130 that matches the random pattern, then the power device 110 may determine that the sensor 130 is colocated with the selected light fixture 120.

Commissioning the lighting system may be performed manually. For example, a commissioning wand or pointing device may be used to commission the lighting system. The pointing device may emit visible light. The pointing device may include any visible light emitting device, such as a flashlight, laser pointer, a hand-held reflector, a display screen, a cell phone, a laptop, a personal digital assistant, a tablet computer or other touch screen device, or any other device that transmits visible light detectable by one or more of the sensors. The pointing device may or may not be hand-held. For example, the pointing device may include a display screen coupled to a desktop computer, which is wheeled around on a cart.

In one example, the pointing device may include a directional LED light source that produces light modulated at the common carrier frequency or pulse coding of the system 100. The filter 160 or filters 160 may be tuned to the common carrier frequency or coding. A user may direct the pointing device at one of the sensors 130 in the lighting area 140. Accordingly, the power device 110 may receive an indication that the filtered signal of the sensor 130 indicates the sensor 130 received light from the pointing device. The sensors 130, from which the indication is received, may be determined to be colocated. Accordingly, the system 100 may more accurately detect light from the pointing device because light produced by the pointing device is distinguishable from light produced by other sources.

The light source in the pointing device may have an alternative modulation frequency or pulse coding that is different from the common carrier frequency or pulse coding of the system 100. The filter 160 or filters 160 may be tuned to the alternative modulation frequency or pulse coding during commissioning of the lighting system or during any other time period. For example, the alternative modulation frequency may be the alternate carrier frequency. Further examples of commissioning the lighting system are described in U.S. Patent Application Publication 2011/0199004 A1, published Aug. 18, 2011.

The system 100 may perform any number of operations in response to receiving an indication that the filtered signal of the sensor 130 indicates the sensor 130 received light from the pointing device. For example, the system 100 may modify the membership of a group of the light fixtures 120 in response to receiving an indication that the filtered signal of the sensor 130 indicates the sensor 130 received light from the pointing device. Different frequencies, frequency patterns, or pulse codings and patterns, emitted by the pointing device may indicate corresponding commands transmitted from the pointing device to the system 100.

The system 100 may detect a signature waveform from a light source and identify some interesting aspect of that light source, such as the type of light source. The signature waveform may include identifying characteristics that indicate the manufacturer of the light source, a model number of the light source, a model number of a ballast, or any other aspect of the light source.

Commissioning the lighting system may include identifying the type of light fixtures 120 that are installed. Each type of light fixture may produce a signature waveform that is an identifying characteristic of that type of light fixture. For example, a magnetic core & coil-type ballast driving T12 fluorescent tubes may generate light having primarily a 60 hertz component in the frequency spectrum. In contrast, a digital ballast driving T8 fluorescent tubes may generate light having frequency components primarily greater than 100 kilohertz in the frequency spectrum. Incandescent lights may produce light having primarily a frequency component that corresponds to the frequency, such as 60 hertz, of the Alternating Current (AC) that powers the incandescent lights. LEDs powered by the power device 110 may generate light having primarily a frequency component at the carrier frequency or some other frequency. Daylight may have a stochastic (random) waveform in the very low frequency range (<1 Hz). Accordingly, the filter 160 may filter or otherwise process the sensor signal in order to determine what the characteristics are of the detected light in the frequency spectrum. Alternatively or in addition, the signature waveform may include identifying characteristics not readily identifiable in the frequency spectrum.

In order to identify the type of light fixtures 120 that are installed, the power device 110 may selectively illuminate each of the light fixtures 120. When the light fixture 120 is illuminated, the sensors 130, such as the sensors 130 that are colocated with the light fixture 120, may detect the light that the light fixture 120 produces. The power device 110 may look up the identifying characteristics of detected light in a fixture type table. The fixture type table may include entries corresponding to light fixture types. The light fixture type table entries may include identifying characteristics of the signature waveform of the corresponding light fixture types. In addition, the light fixture type table entries may include fixture information, such as a manufacturer name, a model number, a light fixture type, and/or any other information about the light fixtures 120. The light fixture type table may be stored in a memory of the power device 110 or in some other memory or storage device.

The light fixture type table may be in the form of any data structure. Examples of the light fixture type table include a programmatic array and a relational database table.

The system 100 may include more, fewer, or different components than illustrated in FIG. 1. For example, the system 100 may include any number of light fixtures 120 and sensors 130. The system may include any number of lighting areas 140. The system 100 may include different components, such as input devices or output devices. Examples of input devices include switches and touchscreens. Examples of output devices include a display.

The system 100 may include multiple power devices 110. The power devices 110 may communicate with each other over a network. For example, the power devices 110 may coordinate with each other over the network in order to perform auto-commissioning of the entire lighting system. The network may include a local area network (LAN), a wireless local area network (WLAN), a personal area network (PAN), a wide area network (WAN), the Internet, any other now known or later developed communications network, or any combination thereof.

The system 100 may be implemented in many different ways. For example, the filter 160 may be included in each of the sensors 130 as described above. Alternatively, the unfiltered sensor signal from the sensor 130 may be transmitted in digital or analog form to the power device 110, and the power device 110 includes the filter 160 or otherwise performs the filtering. Alternatively, the filter 160 may be included in a circuit, such as an adapter circuit, that is external to the sensor 130. The external circuit may be electrically coupled to or in communication with the sensor 130.

The sensors 130 are described above as performing a variety of operations, such as communicating with the power device 110. Alternatively or in addition, the same operations may be performed in whole or in part by the circuit external to the sensor 130, such as the adapter circuit. For example, the adapter circuit may include a communication circuit that communicates with the power device 110. The adapter circuit may receive the unfiltered sensor signal from sensor 130, and generate the filtered signal therefrom. Alternatively or in addition, the adapter circuit may transmit the unfiltered sensor signal and/or the filtered signal to the power device 110 with the communication circuit.

In one example, the adapter circuit, instead of the sensor 130, may be electrically coupled to the wiring 150 that powers a corresponding one of the light fixtures 120. The power device 110 may provide power to the sensor 130 via the adapter circuit. Alternatively or in addition, the sensor 130 may be powered from some other source.

In some examples, the lighting system 100 may not have a one to one correspondence between the light fixtures 120 and the sensors 130. The number of the sensors 130 may be different than the number of the light fixtures 120. One or more of the sensors 130 may be electrically coupled to the power device 110 via wiring that is separate from the wiring 150 that electrically couples the light fixtures 120 to the power device 110.

The communication between the power device 110 and the sensor 130 and/or the adapter circuit may involve any protocol, proprietary or standard. The communication may be over the wiring 150 as illustrated in FIG. 1 or over any other communications network.

The power device 110 is described above as performing a variety of operations. Alternatively or in addition, the same operations may be performed in whole or in part by a control device instead of the power device 110. Examples of the control device include a computing device, a computer, a laptop, a smart phone, a server, an integrated circuit, or any other suitable device. The control device may include a commissioning module that performs operations of the auto-commissioning logic.

In one example, the filter 160 may be a commissioning filter that is used only during commissioning. Alternatively, the filter 160 may be used for purposes in addition to commissioning. For example, the filter 160 may be used for daylight harvesting.

Figure 2:
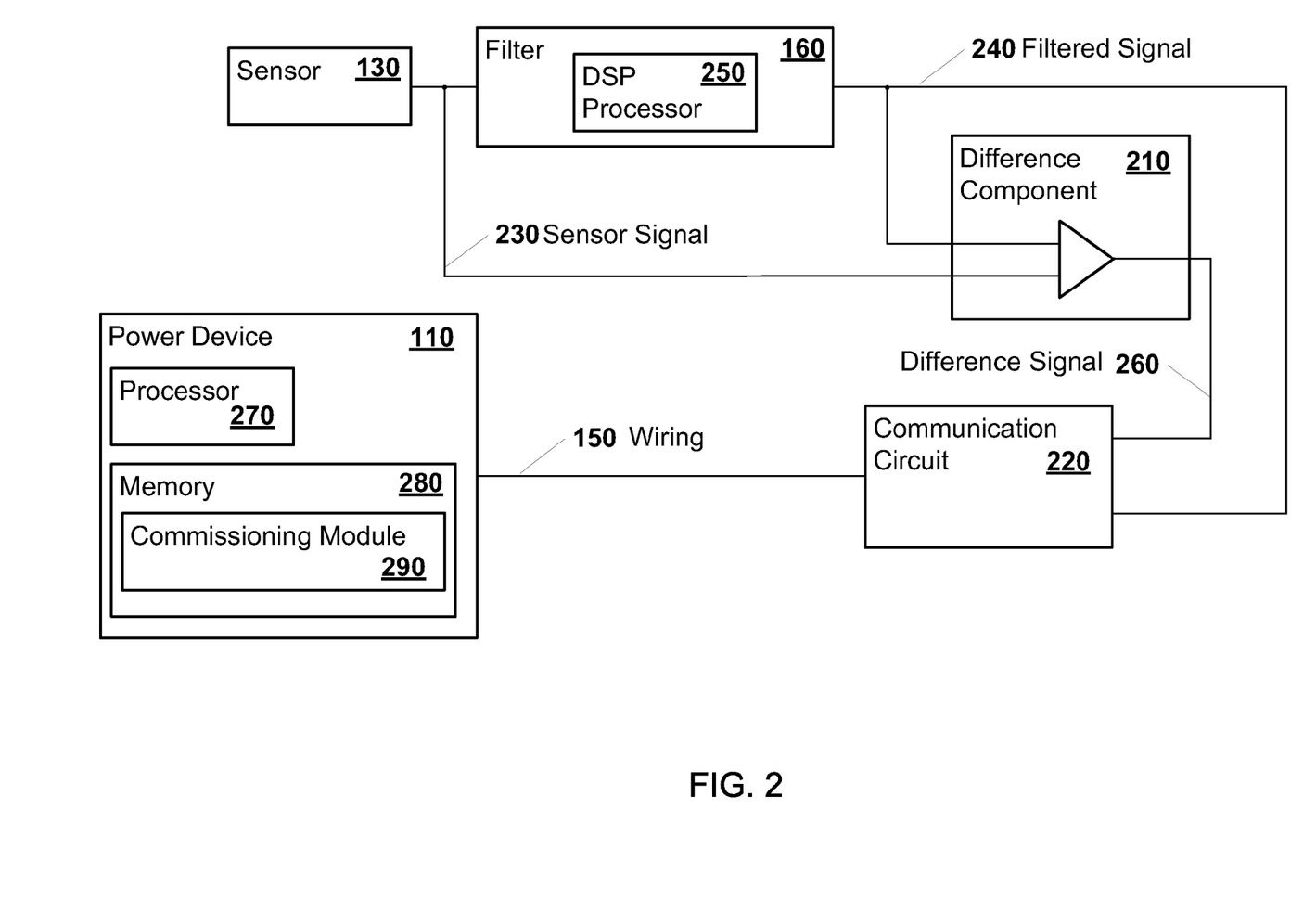
FIG. 2 illustrates an example of a filter.

FIG. 2 illustrates an example of the filter 160 and supporting entities such as a difference component 210 and a communication circuit 220. During operation of system 100, the sensor 130 may generate a sensor signal 230 that is received by the filter 160. The sensor signal 230 may be a digital or analog signal that indicates the amount of light sensed by the sensor 230. For example, the amplitude of the sensor signal 230 may represent the amount of light that the sensor 130 senses. The light detected by the sensor 130 may include light from one or more of the light fixtures 120. Alternatively or in addition, the light detected by the sensor 130 may include light from non-system light sources, such as the sun.

The filter 160 may filter the sensor signal 230 using one or more components. For example, the filter 160 may include a digital signal processor (DSP) 250 that filters the sensor signal 230. The filter 160 may receive the sensor signal 230, filter the sensor signal 230, and generate a filtered signal 240 as an output signal of the filter 160. The filtered signal 240 may indicate the amount of light that is received by the sensor 130 from one or more of the light fixtures 120 even if light from sources other than the one or more of the light fixtures 120 is also received by the sensor 130. For example, the filter 160 may include a band-pass filter that generates the filtered signal 240, where the filtered signal 240 includes the frequency component of the sensor signal 230 that is centered at the modulation frequency of the power signal powering one or more of the light fixtures 120. In a contrasting example, the filter 160 may include a notch filter that generates the filtered signal 240, where the filtered signal 240 excludes the frequency component of the sensor signal 230 that is centered at the modulation frequency of the power signal powering one or more of the light fixtures 120. A frequency component may be blocked or substantially blocked if the amplitude of the frequency component in the filtered signal 240 is less than 10 percent of the amplitude of the frequency component in the sensor signal 230.

The difference component 210 may subtract the filtered signal 240 from the sensor signal 230 in order to generate a difference signal 260. The difference component 210 may be implemented using any number of mechanisms. In one example, the difference component 210 may include an operational amplifier configured to subtract two input signals: the sensor signal 230 and the filtered signal 240. In a second example, the difference component 210 may include a digital component that calculates the difference between the amplitudes of the sensor signal 230 and the filtered signal 240.

The difference signal 260 may represent the opposite of the filtered signal 240. For example, if the filtered signal 240 represents the amount of system light detected, then the difference signal 260 may represent the amount of non-system light detected. Alternatively, if the filtered signal 240 represents the amount of non-system light detected, then the difference signal 260 may represent the amount of system light detected. The difference signal 260 is a filtered signal derived from the sensor signal 230. Accordingly, the filtered signal may refer to the output of the difference component 210 or any other component of the filter 160, such as the DSP processor 250.

The communication circuit 220 may include any circuit configured to transmit data. The communication circuit 220 may transmit the filtered signal 240, the difference signal 260, or a combination thereof to the power device 110. Alternatively, or in addition, the communication circuit 220 may transmit a portion or information about the filtered signal 240, the difference signal 260, or a combination thereof to the power device 110. The communication circuit 220 may transmit data to the power device over the wiring 150. Alternatively, the communication circuit 220 may transmit the data wirelessly, over optical fiber, or over any other type of network.

The power device 110 may include a processor 270 and a memory 280. The power device 110 may include additional, fewer, or different components. For example, the power device 110 may include a network interface or a communication circuit for receiving data from the communication circuit 220.

The memory 280 may hold the programs and processes that implement the logic described above for execution by the processor 270. As examples, the memory 280 may store program logic that implements a commissioning module 290.

The system 100 may be implemented in many different ways. For example, although some features are shown stored in computer-readable memories (e.g., as logic implemented as computer-executable instructions or as data structures in memory), parts of the system 100 and its logic and data structures may be stored on, distributed across, or read from other machine-readable media. The media may include hard disks, floppy disks, CD-ROMs, and flash drives.

The system 100 may be implemented with additional, different, or fewer entities. As one example, the processor 270 may be implemented as a microprocessor, a microcontroller, a DSP, an application specific integrated circuit (ASIC), discrete logic, or a combination of other types of circuits or logic. As another example, the memory 280 may be a non-volatile and/or volatile memory, such as a random access memory (RAM), a read-only memory (ROM), an erasable programmable read-only memory (EPROM), flash memory, any other type of memory now known or later discovered, or any combination thereof. The memory 280 may include an optical, magnetic (hard-drive) or any other form of data storage device.

The filter 160 may include additional, fewer, or different components. For example, the filter 160 may include the difference component 210. Alternatively or in addition, the filter 160 may include a processor and a memory such as the processor 270 and the memory 280 of the power device 110.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)).

The processor 270 may be in communication with the memory 280. In one example, the processor 270 may also be in communication with additional components, such as a network interface and a display. The processor 270 may be a general processor, central processing unit, server, application specific integrated circuit (ASIC), digital signal processor, field programmable gate array (FPGA), digital circuit, analog circuit, or combinations thereof.

The processor 270 may be one or more devices operable to execute computer executable instructions or computer code embodied in the memory 280 or in other memory to perform the features of the system 100. The computer code may include instructions executable with the processor 270. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code.

Although some features are shown stored in computer-readable memories (e.g., as logic implemented as computer-executable instructions or as data structures in memory), all or part of the logic may be implemented as hardware. For example, the commissioning module 290 may be implemented as digital or analog circuit.

The commissioning module 290 may receive, from the filter 160, an indication of an amount of light generated by a light source other than the light fixture 120. In some examples, the commissioning module 290 may determine a physical location of the light fixture 120 based at least in part on the amount of light that the filtered signal 240 indicates was received by a corresponding sensor 130 from the light source other than the light fixture.

In one example, the light source other than the light fixture may be the sun. The commissioning module 290 may determine a physical location of the light fixture 120 based on the amount of sunlight indicated in the filtered signal 240 of the sensor 130 at a determined time of day. For example, if the filtered signal 240 indicates that more sunlight is received by the sensor 130 in the morning than in the evening, then the sensor 130—and the corresponding light fixture 120—may be in one of the lighting areas 140 that receives light from the east but not from the west.

Figure 3:
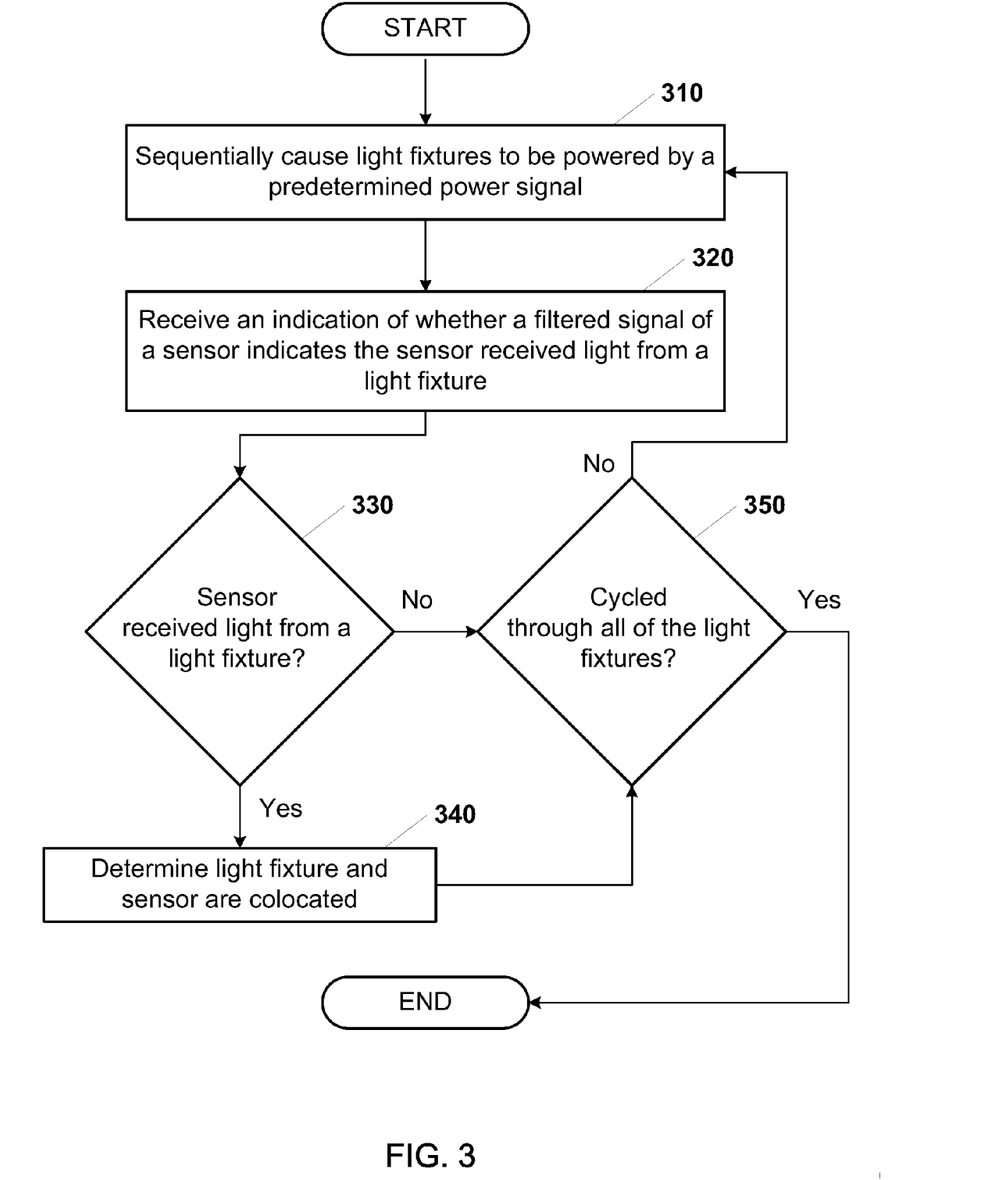
FIG. 3 illustrates an example flow diagram of logic for auto-commissioning a lighting system.

FIG. 3 illustrates an example flow diagram of the logic of auto-commissioning the lighting system. The operations may be executed in a different order than illustrated in FIG. 3. The logic of auto-commissioning the lighting system may include additional, fewer, or different operations than are illustrated in FIG. 3.

Each respective one of multiple light fixtures 120, in a determined order, may be caused to be sequentially powered by a predetermined power signal (310). For example, the commissioning module 290 may cause the power device 110 to cycle through each of the light fixtures 120, providing each of the light fixtures 120 with the predetermined power signal for a determined period of time such that no two lighting fixtures 120 are provided the predetermined power signal at the same time. Alternatively or in addition, the commissioning module 290 may cause the power device 110 to power each of the light fixtures 120 at substantially the same time with corresponding predetermined power signals that are unique with respect to the other corresponding predetermined power signals.

An indication may be received that the filtered signal 240 of the sensor 130 indicates the sensor 130 received light from a light fixture 120 (320). The sensor 130 may receive light from the light fixture 120 and, at the same time, from a source other than the light fixture 120. However, the filter 160 that generates the filtered signal 240 of the sensor 130 may block the component of the sensor signal 240 that represents the light received from the source other than the light fixture 120.

A determination may be made whether the filtered signal 240 of the sensor 130 indicates the sensor 130 received light from the light fixture 120 (330). If the filtered signal 240 of the sensor 130 indicates the sensor 130 received light from the light fixture 120, then the light fixture 120 may be determined to be colocated with the sensor 130 (340). If not, then a determination may be made whether all of the light fixtures 120 have been provided the predetermined power signal (350). Alternatively or in addition, the filter 160 may be selectively tuned so that the filtered signal 240 may indicate whether the sensor 130 received light from the selected light fixture 120.

If the light fixture 120 is determined to be colocated with the sensor 130, then a determination may be made whether all of the light fixtures 120 have been provided the predetermined power signal (350). If all of the light fixtures 120 have not been provided the predetermined power signal, then operations may continue by continuing to cycle through each respective one of multiple light fixtures 120, in the determined order, and causing each to be sequentially powered by a predetermined power signal (310). Alternatively, if all of the light fixtures 120 have been provided the predetermined power signal, then operations may end by, for example, creating and/or operating the light fixtures 120 in groups of colocated light fixtures 120.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system for commissioning a light fixture, the system comprising:
    a power device configured to provide a power signal to a light source associated with the light fixture;
    a sensor configured to generate a sensor signal that indicates an amount of light received by the sensor;
    a filter configured to generate a filtered signal from the sensor signal, wherein the filtered signal includes a component of the sensor signal that represents light from the light source associated with the light fixture, but a component of the sensor signal that represents light from a light source other than the light source associated with the light fixture is at least partially blocked from the filtered signal; and
    a commissioning module configured to determine that the light fixture is colocated with the sensor based on an indication in the filtered signal that the sensor received light from the light source associated with the light fixture.

2. The system of claim 1, wherein the light source associated with the light fixture is included in the light fixture, wherein the power signal is a first power signal, wherein the light fixture is a first light fixture and wherein the commissioning module is further configured to cause the power device to selectively provide the first power signal to the first light fixture and a second light fixture and to cause the power device to provide a second power signal to a third light fixture while the first and second light fixtures are provided the first power signal.

3. The system of claim 2, wherein the second power signal has a given modulation frequency, the first power signal has an alternate modulation frequency, and the filtered signal includes components at frequencies that include the alternate modulation frequency, but components at the given modulation frequency are at least partially blocked from the filtered signal.

4. The system of claim 1, wherein the light fixture is a first light fixture, the light source is a first light source, the power signal is a first power signal and the commissioning module is further configured to cause the power device to provide a second power signal to a second light source associated with a second light fixture, wherein the first and second power signals have different waveforms.

5. The system of claim 4, wherein the commissioning module is further configured to cause the power device to provide the first and second power signals to the first and second light sources concurrently.

6. The system of claim 1, further comprising
    a plurality of sensors including the sensor, wherein a respective one of the plurality of sensors is configured to generate a corresponding sensor signal that indicates an amount of light received by a corresponding one of the plurality of sensors; and
    a plurality of filters including the filter, wherein a respective one of the filters is electrically coupled to the corresponding one of the plurality of sensors, a respective one of the filters is configured to generate a corresponding filtered signal from the corresponding sensor signal, wherein the corresponding filtered signal indicates whether light is received, by the corresponding one of the plurality of filters, from any of the light fixtures that is provided the power signal, but components of the corresponding sensor signal that represent light received by the corresponding sensor from a light source other than the light fixtures is at least partially blocked from the corresponding filtered signal, and a plurality of light fixtures including the light fixture, wherein the commissioning module is further configured to determine, for a respective one of the plurality of sensors, a corresponding subset of the plurality of light fixtures that are colocated with a corresponding one of the sensors based on a corresponding indication by the corresponding filtered signal that the corresponding one of the plurality of sensors received light from the corresponding subset of the plurality of light fixtures.

7. The system of claim 1, wherein the power device is configured to modulate the power signal that is provided to the light fixture based on a stored pattern, and wherein the commissioning module determines, in response a determination that the filtered signal corresponds to the stored pattern, that the sensor is colocated with the light fixture.

8. The system of claim 1, wherein the light fixture is a first light fixture and wherein the commissioning module is further configured to determine that a second light fixture is colocated with the first light fixture based on a determination that the second light fixture is colocated with the sensor.

9. The system of claim 1, wherein the sensor is configured to receive light from the light fixture, and wherein the commissioning module is further configured to identify a light source type of the light fixture from a signature waveform detected in the filtered signal.

10. A tangible non-transitory computer-readable medium encoded with computer executable instructions, the computer executable instructions executable with a processor for commissioning a plurality of light fixtures, the computer-readable medium comprising:
  instructions executable to cause a respective one of a plurality of light sources corresponding to a respective one of the plurality of light fixtures to be powered by a power signal;
  instructions executable to receive an indication that a filtered signal of a sensor indicates the sensor received light from a selected one of the plurality of light sources associated with a selected one of the plurality of light fixtures, wherein the filtered signal includes a component of a sensor signal that represents light from the selected one of the plurality of light sources associated with the selected one of the plurality of light fixtures, but a component of the sensor signal that represents light from a source other than the selected one of the plurality of light sources is at least partially blocked from the filtered signal; and
  instructions executable to determine that the selected one of the plurality of light fixtures is colocated with the sensor based on the indication that the filtered signal of the sensor indicates the sensor received light from the selected one of the plurality of light sources.

11. The computer-readable medium of claim 10, wherein the power signal is different for at least two of the plurality of light sources.

12. The computer-readable medium of claim 11 further comprising instructions executable to cause at least two of the plurality of light sources to be powered by the power signal concurrently.

13. The computer-readable medium of claim 10 further comprising:
  instructions executable to receive an indication that the filtered signal of the sensor indicates the sensor received light from a handheld pointing device based on a component of the filtered signal corresponding to a component of light generated by the handheld pointing device; and
  instructions executable to include one of the plurality of light fixtures in a group of the light fixtures in response to receipt of the indication that the filtered signal indicates the sensor received light from the handheld pointing device.

14. A method to commission a lighting system, the method comprising:
  causing a plurality of light sources associated with a plurality of light fixtures to be powered by a power signal;
  receiving an indication that a filtered signal of a sensor signal from a sensor indicates the sensor received light from at least one of the plurality of light sources associated with at least one of the plurality of light fixtures, wherein the filtered signal includes a component of the sensor signal that represents light from the at least one of the plurality of light sources, but a component of the sensor signal that represents light from a light source other than the at least one of the plurality of light sources is at least partially blocked from the filtered signal; and
  determining that the at least one of the plurality of light fixtures is colocated with the sensor based on receipt of the indication that the filtered signal of the sensor indicates the sensor received light from the at least one light source associated with the at least one of the plurality of light fixtures.

15. The method of claim 14 further comprising:
  determining, for at least one of the sensors, a group of the light fixtures comprising the light fixtures that are colocated with the at least one of the sensors based on the indication by the filtered signal that the at least one of the sensors received light from the light fixtures in the group.

16. The method of claim 14 further comprising:
  receiving an indication by the filtered signal of the sensor signal that the sensor received light from a pointing device, wherein the filtered signal includes a component of the sensor signal that represents the received light from the pointing device; and
  performing a command for commissioning the lighting system in response to receipt of the indication by the filtered signal of the sensor.

17. The method of claim 14 further comprising modifying a carrier frequency of the power signal from a given carrier frequency to an alternate carrier frequency, wherein the filtered signal includes a component of the alternate carrier frequency, but a component of the common carrier frequency is at least partially blocked from the filtered signal.

18. A lighting system comprising:
  a light fixture that is configured to illuminate a lighting area;
  a sensor configured to detect light in the lighting area and generate a sensor signal representing the light detected by the sensor;
  a filter configured to generate a filtered signal from the sensor signal, wherein the filtered signal includes a component of the sensor signal that represents light from the light fixture, but a component of the sensor signal that represents light from a light source other than the light fixture is at least partially blocked from the filtered signal; and
  a commissioning module configured to obtain, from the filtered signal, an indication of an amount of light generated by the light source other than the light fixture, wherein the commissioning module is further configured to determine a physical location of the light fixture based at least in part on the amount of light detected by the sensor that is generated by the light source other than the light fixture.

19. The lighting system of claim 18, wherein the light source other than the light fixture is coming from a sunlight, and the commissioning module is further configured to determine the physical location of the light fixture based on the amount of sunlight indicated in the filtered signal at a given time of day.

* * * * *